ANDREW S. YEISER
INVENTOR.

BY

Richard P. Albert
AGENT

Oct. 25, 1966   A. S. YEISER   3,281,779
POSITION DETECTING MEANS FOR VEHICLES
Filed Dec. 31, 1962   3 Sheets-Sheet 3

INVENTOR.
ANDREW S. YEISER
BY
Richard P. Albert
AGENT ns Patent Office 3,281,779
Patented Oct. 25, 1966

3,281,779
POSITION DETECTING MEANS FOR VEHICLES
Andrew S. Yeiser, Woodland Hills, Calif., assignor, by mesne assignments, to The Bunker-Ramo Corporation, Stamford, Conn., a corporation of Delaware
Filed Dec. 31, 1962, Ser. No. 248,383
7 Claims. (Cl. 340—23)

This invention relates to apparatus for detecting one or more desired characteristics of vehicles. More particularly, this invention relates to a system which has a first cooperating member fixedly positioned along the path of the vehicle and a second cooperating member mounted on the vehicle. The relative motion between the cooperating members causes an electrical signal to be generated which represents at least one characteristic of the vehicle.

This invention has particular utility in railroad operations so it will be described with reference to trains. However, the invention is not limited to use with trains and can be used to detect one or more desired characteristics of any vehicle traveling a predetermined course.

A major problem facing railroad companies today is that safety requirements for operations of trains are such that a single line of railroad track is unduly limited in the number of trains which are allowed to be on it at any one time. This is due mostly to uncertainty of the position of a given train and uncertainty of the distance between two or more trains on a given line of track. The engineer of a train cannot be depended upon to maintain safe operating distances between his and other trains because he cannot observe beyond a curve and under certain weather conditions cannot even observe a reasonable distance along a straight track in front of him.

Attempts have been made to provide equipment trackside which detects the presence of a train. However, such track-side equipment is very costly to maintain. Also the present known track-side equipment is too costly to be installed at relatively short intervals along the track in order to permit a safe increase of traffic on the track.

The present invention solves the above-mentioned problem by providing a detecting system which employs a novel, inexpensive, coded apparatus which is used in cooperation with a detecting device for reading the code of the coded apparatus. The present invention also provides a detecting system which is completely insensitive to the speed of the vehicle. Means are provided for transmitting the characteristics of the vehicle thus obtained to a central control point.

In one embodiment, the coded apparatus is fixedly mounted along the route of the vehicle and is digitally coded to indicate its geographic position. The detecting device includes a magnetic pickup head so arranged on the vehicle that it generates a digitally coded electrical signal corresponding to the digital code of the coded apparatus each time the detecting device passes adjacent the coded apparatus.

The present invention contemplates having the coded apparatus spaced along the route of the vehicle so that the detecting device is only operative a portion of the time for geographic position information. A storage device is used to store the information provided by the detecting device in such a manner that the stored information does not reflect in any way the speed of the vehicle as it passed the coded apparatus. Furthermore, odometer apparatus is used in cooperation with the wheels of the vehicle to generate electrical signals representing the geographic position of the vehicle with respect to the last passed coded apparatus.

The electrical signals in the storage device and those generated by the odometer apparatus can be transmitted to a central control point, and such transmission can be initiated by a command signal from the central control point.

The present invention, therefore, permits a central controller at his option to obtain information about any vehicle having a detecting device thereon. The central control can include a computer which is programmed to interrogate vehicles periodically and compare the position information to determine if the vehicles have safe operating distances between them and, if not, to sound an alarm or the like.

The present invention thus provides, in one embodiment, a detecting system having passive apparatus trackside which requires virtually no maintenance. All of the electrical equipment which might require servicing may be positioned on the train and can be serviced in the train yards where the costs of such servicing are relatively low.

The invention, together with other features and advantages, will be better understood from the following description, taken in conjunction with the accompanying drawings, in which.

Figure 1:
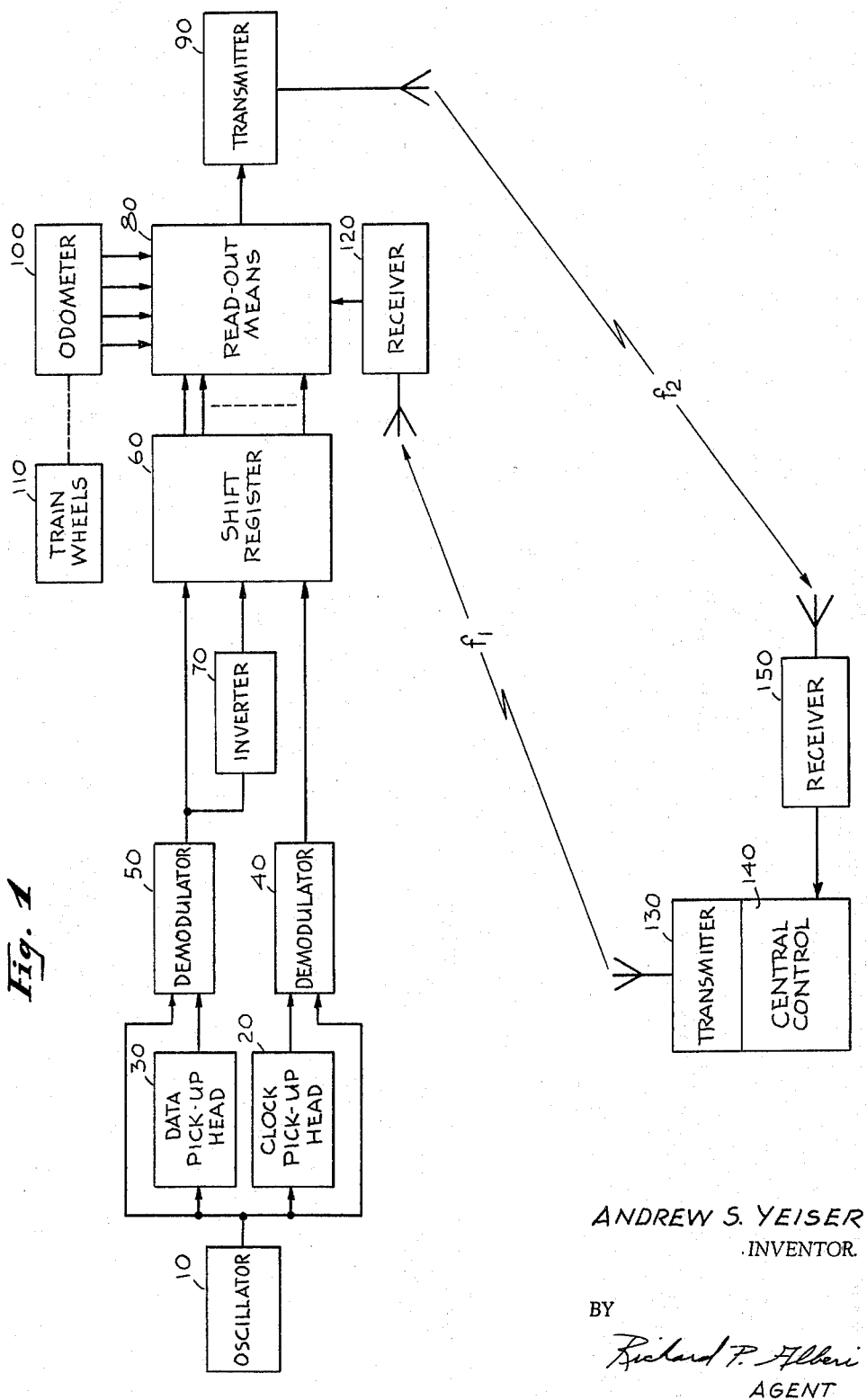
FIGURE 1 is a block diagram of one system embodying the invention.

A preferred embodiment of the present invention employs first and second cooperating means for generating electrical data signals in response to relative movement between the cooperating means. As seen in FIG. 1, the first cooperating means comprises an oscillator 10, which energizes a clock pickup head 20 and a data pickup head 30. The second cooperating means comprises a coded apparatus (to be described below with reference to FIG. 2) with which the pickup heads 20 and 30 coact to generate a series of electrical clock signals and electrical data signals, which correspond to the code of the coded apparatus. A demodulator 40, electrically connected to the output of clock pickup head 20, and a demodulator 50, electrically connected to the output of the data pickup head 30, rectify the electrical signals from the clock and data pickup heads 20 and 30, respectively.

The coded apparatus is positioned at intervals along a railroad track and since it is desirable, at any time, to know which coded apparatus a train last passed, it is necessary to provide some means of storing the electrical data signals. A shift register is a convenient apparatus for storing electrical signals and therefore shift register 60 is electrically connected to the demodulators 40 and 50. Shift register 60 may be any of a number of well-known shift registers which have serial input and parallel output capabilities. A typical shift register is shown and described on pages 678 and 679 in "Digital Computer and Control Engineering" by Robert Steven Ledley, published in 1960, and which can be found in the U.S. Library of Congress, Catalog Card Number 59-15055.

As is known in the computer art, a complementary signal to the data or information signal is commonly provided to reset the shift register. Inverter 70 is therefore electrically connected between demodulator 50 and shift register 60 to provide the complement of the data signal to the shift register 60.

Readout means 80 is electrically connected to the shift register 60 and operates to transfer serially to a transmitter 90 the electrical information stored in the shift register 60. An odometer 100 is mechanically connected to a wheel 110 of the train and provides electrical signals in binary coded form, as will be described below in connection with FIG. 4, which provide information as to the distance of the train from the last coded apparatus passed. The odometer is connected to the train wheels 110 in a conventional manner by way of gear reduction means or the like.

A signal receiver 120 is also positioned on the train, and is arranged to actuate the readout means 80 upon receipt of a signal having a predetermined frequency $f_1$. Therefore, the electrical information stored in the shift register 60 and generated by the odometer 100 is passed to the transmitter 90 when the receiver 120 triggers the readout means 80. Of course, the readout means may be arranged to be triggered automatically at desired time intervals. A transmitter 130 is located at a central control point 140 and transmits signals having the frequency $f_1$ to the receiver 120. The transmitter 130 is activated manually or automatically when the central control point desires information as to the position of the train. Receiver 150 at the central control point is tuned to a frequency $f_2$ of the transmitter 90 to receive the position information transmitted by transmitter 90. The central control point 140 can include display means which immediately displays the information from receiver 150 or it can include storage means such as a shift register which stores the information received by receiver 150 and later displays this information upon command.

In operation, the data and clock pickup heads are energized by the oscillator 10 and generate pulses when the train passes adjacent the coded apparatus. The coded apparatus are at known geographic positions and the code, as will be described below, indicates this known geographic position. This electrical information is stored in the shift register 60. The odometer 100 provides information as to the position of the train between the coded apparatus because it is connected to the train wheels. Although an odometer connected to the train wheels is not sufficiently reliable for full time use as the sole means of determining the position of the train, it is possible to use an odometer to accurately determine the position of the train between coded apparatus if the odometer is monitored or checked often enough. For example, coded apparatus may be positioned one mile apart, and the odometer can be reset while passing each coded apparatus.

When the operator at the central control point desires to know the position of this particular train, he activates transmitter 130. The signal transmitted by the transmitter 130 is received by receiver 120, which triggers the readout means 80. The transmitter 90 then receives the electrical signals from the shift register 60 and the odometer 100 and transmits them to receiver 150 at the central control point 140. The central control point may include a computer which can be programmed to activate the transmitter 130 at given time intervals or to activate several transmitters thereby obtaining information from several trains. The frequencies of the transmitters should preferably be different to interrogate different trains to prevent confusion in identifying the responding train. The computer can use the information received from the several trains to provide a signal to alert either the engineer of a train or a person at the central control point whenever two or more trains are dangerously close to one another.

Figure 2:
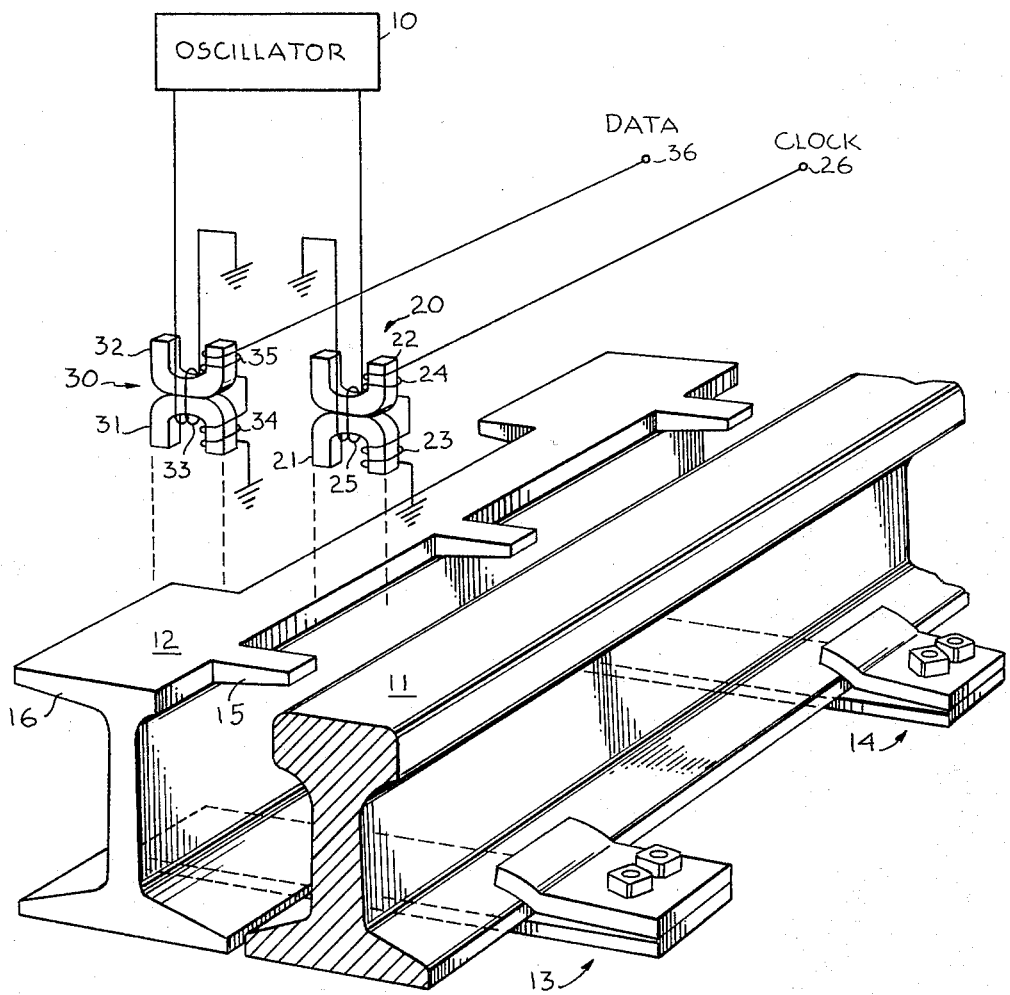
FIG. 2 is a perspective diagrammatic view of a coded I-beam and typical magnetic pickup heads that may be utilized in the system of FIG. 1.

A preferred form of coded apparatus comprises a bar or section of I-beam as shown in FIG. 2. The I-beam provides digitally coded information as to the geographic position of that particular I-beam, and also provides means for generating a clock signal.

A rail 11 on which the train rides has a short section of a digitally encoded I-beam 12 attached to it by means of clamps 13 and 14. The I-beam 12 is constructed of a ferromagnetic material such as iron, steel or the like, and its top flange portions 15 and 16 respectively define first and second information channels. Each of the flange portions has notches or cutouts formed therein to thus define teeth which are used to bridge a gap defined in a passing pickup head to be discussed hereinafter. The teeth on the flange 15 are shown at regularly spaced intervals, while the teeth on the flange portion 16 are irregularly spaced. The teeth on the flange 15 provide means for generating clock pulses or signals. The teeth on the flange 16 are formed in accordance with a code to represent desired information and are utilized to provide data signals. Each of the teeth on the flange 15 may be considered as defining a bit position and whether or not a tooth exists in the corresponding position on flange 16 determines whether a 0 or 1 code bit is defined.

The magnetic pickup head 20 (clock head) is fixed to the train in a position such that as the train moves along the track, the pickup head passes over the toothed flange portion 15 of I-beam 12. For clarity of illustration, the pickup heads 20 and 30 are shown in FIG. 2 spaced farther from the I-beam 12 than would probably be the case in actuality. The pickup head 20 may be of differential transformer type having lower and upper cores 21 and 22 with secondary windings 23 and 24, respectively, wound thereon and a primary winding 25 wound on both cores. The lower core 21 has an air gap, the magnetic reluctance of which changes in response to the presence or absence of magnetic material adjacent the gap. The primary winding 25 of the head is energized by the oscillator 10, and the secondary windings 23 and 24 are connected in series opposition and to an output terminal 26. A slug (not shown) may be used to adjust the magnetic reluctance of an air gap in the upper core 22, so that, in the absence of magnetic material adjacent the gap in the lower core 21, there is a desired output from the secondary windings.

The train also carries a data pickup head 30, which passes over the toothed flange portion 16 as the clock head 20 passes over the portion 15. Preferably, the heads 20 and 30 are arranged opposite each other on a line normal to the longitudinal axis of the I-beam 12. The data pickup head 30 is constructed substantially the same as the clock pickup head 20 with two cores 31 and 32 and with a primary winding 33 electrically connected to the oscillator 10. Its output windings 34 and 35 are connected in series opposition so as to provide an output signal at a terminal 36 whenever there is an inequality between the magnetic reluctances of the cores 31 and 32. It should be noted that the type of pickup head used to generate the clock and data pulses may be any suitable type which will generate identifiable electrical output signals and the type shown is for the purpose of illustration only. Also, the particular configuration of the beam 12 may be varied so long as it provides means for varying characteristics of the pickup heads 20 and 30 as they pass by it.

It is desirable when entering and storing information in a shift register to use direct current data and clock signals and, therefore, demodulators 40 and 50 are electrically connected to the pickup heads 20 and 30 respectively. The demodulators may be any one of several well known types and, of course, must be compatible with the pickup heads. Preferably, the demodulators are of a phase-sensitive type. The primary windings 25 and 33 and secondary windings 23, 24, 34 and 35 are so wound that secondary windings 23 and 34 have an alternating current induced therein which is 180° out of phase with the alternating current induced in the secondary windings 24 and 35. Therefore, if the reluctances of cores 22 and 32 are less than the reluctances of cores 21 and 31, respectively, then demodulators 40 and 50 may provide, for example, negative direct current output signals. Conversely, if the reluctances of cores 21 and 31 are less than those of cores 22 and 32, the demodulators may provide positive signals. Preferably, the reluctances of cores 22 and 32 are purposely made to be less than the reluctances of cores 21 and 31 (when the pickup heads are away from an I-beam) to provide a bias on each head. With such biasing, large decreases of reluctances in cores 21 and 31 are required to change the polarities of the output signals of the demodulators. Consequently, small signal variations from the pickup heads 20 and 30 are effectively filtered out because they do not have sufficient amplitude to cause changes of polarity in the outputs of the demodulators 40 and 50.

As stated above, the pickup heads 20 and 30 are mounted on the train which is traveling on rail 11. The oscillator 10 is continuously energizing the primary windings 25 and 33. When the train is not in the vicinity of the coded beam 12, even though the electrical signals generated in the secondary windings 34 and 35 of the data pickup head 30 oppose each other, there is an output signal at terminal 36. This occurs because the reluctance in the core 32 is slightly less than the reluctance in the core 31 to provide a bias, as previously described. The same condition exists in the clock pickup head 20. However, when the train passes the I-beam 12, the clock pickup head 20 detects the alternate presence and absence of the metal along the flange portion 15. The presence of the metal along the flange 15 sufficiently lowers the reluctance of the core member 21 to provide signals at terminal 26 which are 180° out of phase with the previous signals appearing at terminal 26. Since the teeth along the flange portion 15 of I-beam 12 are uniformly spaced, the pulses of the electrical signals appearing on terminal 26 are uniformly spaced in time, assuming the speed of the train is constant, and may be used to generate clock pulses.

The data pickup head 30, however, does not generate uniformly spaced pulses because the cutouts are generally not uniformly spaced along the flange portion 16. The cutouts may be spaced in accordance with a binary code, so that each I-beam may be identified by a number which is unique to a particular railroad track and to the location of the I-beam along it. Thus, movement of the pickup head 30 past the coded I-beam results in the generation of digital information-bearing output signals. The information-bearing signals from the pickup head 30 are demodulated and stored in shift register 60. The speed of the train does not affect the information signals because a data pulse can only be stored and shifted in the shift register during the presence of a clock pulse. Therefore, because the speed of the train affects both the clock and data signals in the same manner, they are always in synchronism. As previously explained, the coded position information is transmitted to a central control point. The exact position of a train within a range of a few feet can be determined, as will be described below, through the use of additional information obtained from an odometer. Therefore the headway between trains can be safely reduced.

Figure 3:
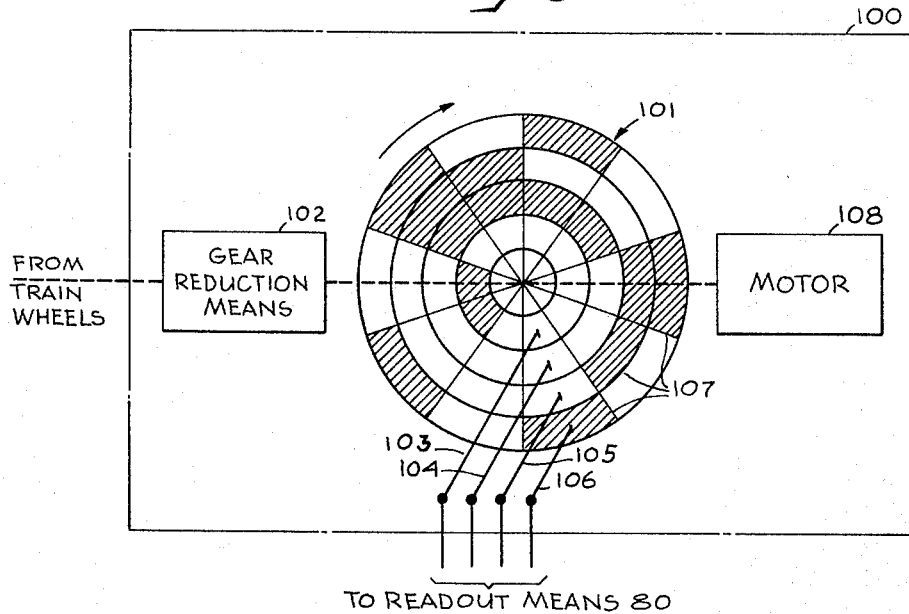
FIG. 3 is a diagrammatic view of a typical odometer having an electrical signal output.

A typical odometer 100, which provides information as to the position of the train between sections of coded I-beams, is shown in FIG. 3. A disc 101 is mechanically connected through gear reduction means 102 to the train wheels 110 as described above. The gear reduction means can comprise any combination of gears which provides one complete revolution of the disc 101 each time the train travels from one coded I-beam to the next, for example, each mile. One side of the disc 101 is equally divided radially into ten sections and into four concentric tracks. Each of four brushes 103, 104, 105 and 106 makes contact with one track on the disc 101 with all four contact points lying substantially on a radial line. The disc 101 is plated or coated with a conductive material as shown by shaded areas 107. The conductive material is energized from a source of electrical potential (not shown) and, as the disc 101 rotates, the brushes 103, 104, 105, and 106 make electrical contact with the energized areas. The number of brushes which make contact is, of course, dependent upon the locations of the conductive areas. It is a simple matter, therefore, to code the tracks so that when the disc is in a zero position (indicating zero miles traveled) no brushes are energized; when the disc is in a first position (0.1 mile traveled), the brush 106 is energized; and when the disc is in its second position (0.2 mile traveled), the brush 105 is energized. If the brushes 105 and 106 are both energized, it indicates that the disc is in the third position (0.3 mile traveled), and so on. The disc shown is divided into ten portions, and, when such a disc is used and the sections of coded I-beams as set forth above are positioned one mile apart, the electrical output of the odometer 100, on lines 103, 104, 105, and 106, indicates in binary form the distance in tenths of a mile traveled since passing the last coded I-beam. Of course, the invention is not limited to the use of any particular form of odometer or a particular type or means of coding. A more sophisticated odometer can be used which also displays the distance from the last I-beam section to the engineer of the train. Also, the disc 101 may be mechanically driven by a motor 108 to its zero position each time the clock pickup head 20 generates a series of clock pulses, indicating that the train is passing a section of coded I-beam. The motor may be energized through a multivibrator, for example, which is triggered by the first clock pulse received from each I-beam, and deenergized through a limit switch (not shown) when the zero position is reached. This then enables the disc 101 to be reset once each mile so that the chance of an erroneous odometer reading is greatly reduced.

Figure 4:
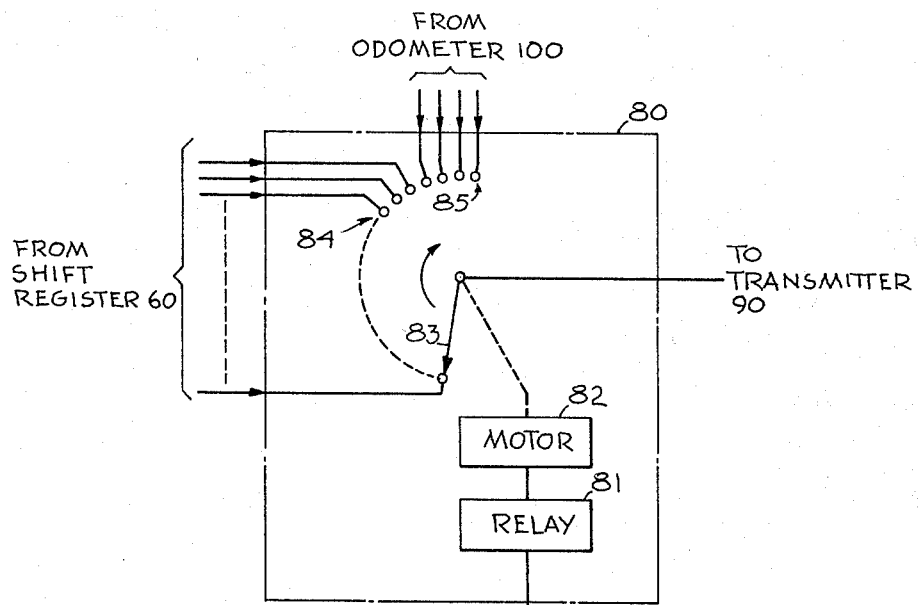
FIG. 4 is a schematic drawing of a typical readout device.

The readout means 80 provides means for serially reading the digital information from the shift register and the odometer so that the information may be supplied to the transmitter 90. In a simple form, as shown in FIG. 4, the readout means 80 comprises a relay 81 electrically connected to receive the output of the receiver 120. A signal received by receiver 120 causes the relay 81 to be energized and close its contacts, which in turn causes a motor 82 to be energized. A commutator wiper arm 83 is mechanically connected to the motor 82. The commutator wiper arm 83 is capable of sequentially making contact with a plurality of terminals comprising two series of terminals 84 and 85. Electrical connections from the shift register 60 are made to the first series of terminals and the electrical connections from the odometer 100 are made to the second series of terminals. Therefore, in one complete revolution, the commutator wiper arm 83 sequentially makes contact first with the electrical connections from the shift register and then with the electrical connections from the odometer 100.

In operation, the receiver 120 receives a signal commanding the transmitter 190 to transmit the position information stored in the shift register 60 and in the odometer 100. This command signal energizes the relay 81, which, in turn, causes the motor 82 to be energized. The wiper arm 83 is then driven one complete revolution by the motor 82. The wiper arm sequentially makes contact with each of the terminals, thereby allowing the information stored in the shift register 60 and the odometer 100 to be serially presented to the transmitter 90. The relay 81 (and hence the motor) may be deenergized at the proper time by a limit switch (not shown).

In putting the present invention into operation, coded sections of I-beams are positioned along the railroad track at known positions, for example, one mile apart starting from a given point. Each train traveling this particular line of track has clock and data pickup heads thereon and the associated circuitry for receiving command signals from the central control point and for transmitting position information from the train to the central control point. The central control point, either manually or automatically, commands each train to send its respective position data to the central control point. With this information, the central control point is able to increase the density of trains on a given track line because, when two or more trains start to get dangerously close to each other, steps can be taken, either manually or automatically, to correct the situation. For example, instructions may be radioed to one or more of the trains to increase or decrease their speeds, thereby increasing the distance between trains to a safe operating distance.

The coded sections of I-beam positioned along the track require virtually no maintenance and, once installed, the only additional cost of increasing the density of trains on the track line is the cost of providing the pickup and transmitting apparatus on each of the trains. Furthermore, the equipment located on the trains may be serviced in the train yard where such servicing is inherently cheaper than is servicing equipment along a track at perhaps a considerable distance from the train yard.

Although the present invention has been described with reference to a train and railroad track, it is understood that it may be used for identifying the position of any vehicle that travels over a known path which can accommodate the coded I-beams or similar coded structure.

It is also to be noted that the coded apparatus can be positioned on a vehicle and be coded to identify the vehicle. With the coded apparatus positioned on a train, the pickup heads and associated circuitry are positioned trackside. The geographic position of the track-side equipment is known and this position can be identified by having the frequencies of the various transmitters assigned in accordance with geographic position. Therefore, when a transmission is received on a given frequency, the central control point automatically has information regarding the geographic position of the trackside equipment which has been actuated by the passage of a train. Of course, if the electrical equipment is trackside, then the information from the odometer either has to be transmitted separately from the trains or eliminated entirely. Also, in all probability the track-side equipment need not be interrogated by the central control point but might be actuated automatically by the passage of a train.

Although a preferred embodiment of the invention has been shown and described, it is apparent that many changes and modifications may be made by one skilled in the art without departing from the true spirit and scope of the invention.

The embodiments of the invention in which an exclusive property or privilege is claimed are defined as follows:

1. A system for generating electrical signals representing at least one characteristic of a wheeled vehicle comprising:
   first cooperating means fixedly mounted adjacent to the path of said vehicle and having coding means comprising clock code means and data code means;
   second cooperating means positioned on said vehicle and comprising means for generating electrical clock signals and electrical data signals in response to relative movement between said first and second cooperating means;
   odometer means cooperating with the wheels of said vehicle for generating additional electrical data signals in response to revolutions of said wheels; and
   transmitting means connected to receive and transmit said electrical data and said additional electrical data signals.

2. A system for generating electrical signals representing information corresponding to at least one characteristic of a vehicle traveling on wheels comprising:
   coding means comprising digital clock code means and digital data code means fixedly mounted adjacent the path of said vehicle, said coding means comprising a steel I-beam having two series of notches in the top side thereof, one of said series of notches being equally spaced and the other said series of notches being spaced according to a given code;
   first and second magnetic pickup means mounted on said vehicle and positioned such that when said vehicle passes in the vicinity of said coded means said first pickup means passes adjacent the first series of notches and generates digital clock pulses and said second pickup means passes adjacent the second series of said notches and generates digital data pulses;
   shift register means responsive to said clock and data pulses to store said data pulses;
   odometer means responsive to revolutions of said wheels to generate an electrical signal in response to the number of revolutions of said wheels,
   readout means electrically connected to said odometer and said shift register;
   transmitter means electrically connected to said readout means; and
   means for actuating said readout means to cause said electrical signals stored in said shift register and said signals generated by said odometer means to be passed to and transmitted by said transmitter.

3. In a system for generating electrical signals representing information corresponding to at least one characteristic of a vehicle and having first and second cooperating means, one of which is fixedly mounted adjacent the path of said vehicle and the other of which is positioned on said vehicle, and wherein the first cooperating means has coding means comprising clock code means and data code means and wherein the second cooperating means generates first and second electrical signals corresponding to the clock code and data code means in response to movement of the vehicle relative to the fixedly mounted cooperating means;
   improved first and second cooperating means wherein said first cooperating means comprises a steel I-beam having cutouts forming teeth therein and wherein said second cooperating means comprises at least one pickup head capable of generating an electrical pulse each time said head passes one of said teeth.

4. The improved apparatus as claimed in claim 3 wherein said first cooperating member having cutouts forming teeth therein comprises two series of cutouts forming two series of teeth therein and wherein said second cooperating means comprises two magnetic pickup heads so arranged that one of said magnetic pickup heads generates an electrical signal corresponding to each tooth in one series of said teeth and the second magnetic pickup head generates a second electrical signal corresponding to each tooth in said second series of teeth.

5. The apparatus as claimed in claim 3 wherein said first cooperating means having cutouts forming teeth therein has the teeth positioned to form a digital code for identifying said first cooperating member.

6. Apparatus for indicating the location of vehicles moving along defined paths including:
   a plurality of passive code devices distributed along said paths, each code device defining a code uniquely identifying its location;
   each of said code devices comprising a bar formed of ferromagnetic material having spaced teeth thereon defining said codes;
   reading means carried by said vehicles for reading each of said code devices it passes, said reading means including first means defining a first magnetic path and second means defining a second magnetic path having a greater reluctance than said first magnetic path and defining a gap therein; and
   means mounting said second means on said vehicle for moving said second means past said bar to cause said teeth on said bar to substantially bridge said gap to thus reduce the reluctance of said second magnetic path to below that of said first magnetic path.

7. Apparatus for indicating the location of vehicles moving along defined paths including:
   a plurality of passive code devices distributed along said paths, each code device defining a code uniquely identifying its location;

each of said code devices comprising a bar formed of ferromagnetic material and defining first and second parallel channels thereon each having a plurality of corresponding bit positions;

first and second adjacently disposed magnetic cores each defining a gap therein carried by said vehicle for movement past and adjacent to said first and second channels respectively; and means carried by said bar at each of said bit positions in at least one of said channels for bridging said first or second magnetic core gaps.

References Cited by the Examiner

UNITED STATES PATENTS

| | | | |
|---|---|---|---|
| 3,016,456 | 1/1962 | Corporon | 246—2 |
| 3,112,908 | 12/1963 | Hailes | 340—23 X |
| 3,117,754 | 1/1964 | Morganstern | 246—2 |

NEIL C. READ, *Primary Examiner.*

A. H. WARING, *Assistant Examiner.*